United States Patent
Rajadurai et al.

(10) Patent No.: US 12,267,676 B2
(45) Date of Patent: Apr. 1, 2025

(54) METHODS AND SYSTEMS FOR AUTHENTICATION AND ESTABLISHMENT OF SECURE CONNECTION FOR EDGE COMPUTING SERVICES

(71) Applicant: Samsung Electronics Co., Ltd., Suwon-si (KR)

(72) Inventors: Rajavelsamy Rajadurai, Karnataka (IN); Nishant Gupta, Karnataka (IN); Rohini Rajendran, Karnataka (IN); Nivedya Parambath Sasi, Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/497,350

(22) Filed: Oct. 8, 2021

(65) Prior Publication Data
US 2022/0116774 A1    Apr. 14, 2022

(30) Foreign Application Priority Data

Oct. 8, 2020  (IN) .............................. 202041043965
Oct. 5, 2021  (IN) .............................. 2020 41043965

(51) Int. Cl.
*H04W 12/06* (2021.01)
*H04W 12/041* (2021.01)
(Continued)

(52) U.S. Cl.
CPC ....... *H04W 12/068* (2021.01); *H04W 12/041* (2021.01); *H04W 12/0431* (2021.01); *H04W 12/0433* (2021.01); *H04W 12/069* (2021.01)

(58) Field of Classification Search
CPC ............ H04W 12/068; H04W 12/041; H04W 12/0431; H04W 12/0433; H04W 12/069; H04L 63/061; H04L 63/0869
See application file for complete search history.

(56) References Cited

U.S. PATENT DOCUMENTS

2012/0297473 A1* 11/2012 Case ...................... H04W 4/70
                                                          726/10
2017/0103388 A1*  4/2017 Pillai .................. G06Q 20/3227
(Continued)

FOREIGN PATENT DOCUMENTS

| EP | 3 713 152 A1 | 9/2020 | |
| WO | 2019/104124 A1 | 5/2019 | |
| WO | WO-2021167417 A1 * | 8/2021 | ............ H04W 12/06 |
| WO | WO-2021233208 A1 * | 11/2021 | ......... H04L 63/0428 |

OTHER PUBLICATIONS

Samsung, 'Authentication/Authorization framework for Edge Enabler Client and Servers', S3-202062, 3GPP TSG-SA3 Meeting #100e, e-meeting, section X.Y.Z.2; and figure X.Y.Z.2-1, Aug. 21, 2020.
(Continued)

*Primary Examiner* — Khoi V Le
(74) *Attorney, Agent, or Firm* — Jefferson IP Law, LLP

(57) ABSTRACT

Methods and systems for authentication and establishment of secure connection for accessing edge computing services are provided. The method includes dynamically deriving a pre-shared key (PSK) and use the dynamically derived PSK for the authentication, while performing or before performing a secure connection establishment or while or before establishing a secure interface between a user equipment (UE), and a server, wherein the UE includes an Edge Enabler Client (EEC), and the server is an Edge Configuration Server (ECS). The method further includes deriving the PSK based on an Authentication and Key Management for Applications (AKMA) application key.

11 Claims, 11 Drawing Sheets

(51) Int. Cl.
*H04W 12/0431* (2021.01)
*H04W 12/0433* (2021.01)
*H04W 12/069* (2021.01)

(56) References Cited

U.S. PATENT DOCUMENTS

| | | | | |
|---|---|---|---|---|
| 2017/0272944 | A1* | 9/2017 | Link, II | H04L 9/0841 |
| 2018/0123784 | A1* | 5/2018 | Gehrmann | H04L 9/0869 |
| 2019/0156019 | A1* | 5/2019 | Chen | H04W 12/0433 |
| 2019/0207759 | A1* | 7/2019 | Chan | H04L 9/0891 |
| 2020/0050747 | A1* | 2/2020 | Egner | H04L 63/0892 |
| 2021/0058780 | A1* | 2/2021 | Yu | H04W 12/08 |
| 2021/0373537 | A1* | 12/2021 | Wei | H04L 63/065 |
| 2021/0400475 | A1* | 12/2021 | Lehtovirta | H04W 12/04 |
| 2023/0026671 | A1* | 1/2023 | Seed | H04W 36/32 |

OTHER PUBLICATIONS

Apple, 'pCR: New solution on authentication based on 3GPP credentials', S3-202151, 3GPP TSG-SA WG3 Meeting #100e, E-meeting, section 3, Aug. 25, 2020.

Catt, 'Key issue on Authentication and Authorization', S3-201672, 3GPP TSG-SA3 Meeting #100e, emeeting, section 4, Aug. 7, 2020.
Samsung, 'Key issue on Authentication/Authorization of Edge Enabler Client', S3-201969, 3GPP TSGSA3 Meeting #100e, e-meeting, section 3, Aug. 7, 2020.
International Search Report and Written Opinion dated Jan. 7, 2022, issued in International Patent Application No. PCT/KR2021/013932.
Indian Office Action dated Jun. 2, 2022, issued in Indan Patent Application No. 202041043965.
Samsung, Resolving editor's note on MAC-I calculation, S3-202621, 3GPP TSG-SA3 Meeting #100bis-e, e-meeting, Oct. 2, 2020, XP051937922.
3GPP TR 33.839 V0.1.0, 3rd Generation Partnership Project; Technical Specification Group Services and System Aspects; Study on Security Aspects of Enhancement of Support for Edge Computing in 5GC, (Release 17), Sep. 14, 2020.
Extended European Search Report dated Jan. 25, 2024, issued in European Patent Application No. 21878065.8.
Indian Hearing Notice dated May 1, 2024, issued in Indian Patent Application No. 202041043965.

* cited by examiner

RELATED ART

FIG. 8A

| Information element | Status | Description |
|---|---|---|
| EEC ID | M | Unique identifier of the EEC |
| Ssecurity credentials | M | Security credentials resulting from a successful authorization for the edge computing service |
| > A-KID/AKMA key ID | O | If EEC does not have a secure connection, then EEC includes AKMA Key Identifier, so that ECS is able to Identify the AAnF serving the UE from the A-KID and obtain the AKMA Application Key $K_{AF}$ |
| Application Client Profile[s] | M | Informatioin about services the EEC wants to connect to, as described in Table 8.2.2-1 |
| UE Identifier | O | The Identifier of the UE (i.e. GPSI or Identity token) |
| Connectivity information | O | List of connectivity information for the UE, e.g. PLMN ID, SSID |
| UE location | O | The location information of the UE<br><br>The UE location is described as clause 7.3.2. |
| | | |

FIG. 8B

| Information element | Status | Description |
|---|---|---|
| List of EDN configuration information | M | List of Edge Data Networks |
| > EDN connection information (NOTE 1) | M | Information required by the UE to establish connection with the Edge Data Network |
| >> DNN/APN | M | Data Network Name/Access Point Name |
| >> S-NSSAI | O | Network Slice information |
| >> EDN Service Area (NOTE 2) | O | EDN service area information. The service area information is a list of Cell list or List of TA, PLMN IDs |
| >List of Edge Enabler Servers | M | List of Edge Enabler Servers of the Edge Data Network |
| >> EES Endpoint | M | The endpoint address (e.g. URI, IP address) of the EES |
| >> Access Token | O | Token to access the endpoint address (e.g. URI, IP address) of the EES, which carries authorization information |
| >> ECSP info | O | Information for Edge Computing Service Provider |
| > Lifetime | O | Time duration for which the EDN configuration information is valid and supposed to be cached in the EEC |
| NOTE1: If the UE is provisioned or pre-configured with URSP rules by the HPLMN, the UE handles the precedence between EDN connection info and URSP rules as defined in 3GPP TS 23.503 clause 6.1.2.2.1. EDN connection info is considered to be part of UE Local Configurations<br>NOTE 2: The EDN service area IE is included only if the EDN is a LADN | | |

METHODS AND SYSTEMS FOR AUTHENTICATION AND ESTABLISHMENT OF SECURE CONNECTION FOR EDGE COMPUTING SERVICES

CROSS-REFERENCE TO RELATED APPLICATION(S)

This application is based on and claims priority under 35 U.S.C. § 119(a) of an Indian Provisional patent application number 202041043965, filed on Oct. 8, 2020, in the Indian Patent Office, and of an Indian Non-Provisional patent application number 202041043965, filed on Oct. 5, 2021, in the Indian Patent Office, the disclosure of each of which is incorporated by reference herein in its entirety.

BACKGROUND

1. Field

The disclosure relates to the field of edge computing systems. More particularly, the disclosure relates to authentication and establishment of secure connection for edge computing services.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

An edge computing system enables deployment of cloud computing and service environments close to User Equipments (UEs)/user devices to provide edge computing services. The edge computing services provide several benefits such as, but are not limited to, lower latency, higher bandwidth, reduced backhaul traffic, prospects for new services compared to cloud environments, and so on.

Also, with the advent of the edge computing system, applications may be more responsive and provide features, which were not possible without the low latency and fast processing capabilities provided by the edge computing system. In the applications like Virtual Reality (VR), network assisted processing rely heavily on the edge computing system. Certain features of the applications may still be provided without the use of the edge computing system, however certain features may not be provided/serviceable without the edge computing system.

The edge computing system may be provided by a service provider such as Mobile Network Operator (MNO), which may not be ubiquitous in near future due to operational and financial constraints. The application, to leverage capabilities and feature provided by the edge computing system has to be aware of the edge computing system/features at its disposal, such as, to enable or disable features, which rely on the use of the edge computing system. In addition, availability of such edge computing system may change dynamically due to multiple reasons. Such changes have to be notified to the applications to fine-tune the provided services accordingly. For instance, the availability of the applications relying on the edge computing system may be dependent on the location of a user, a content that is available at an edge server, or the like.

FIG. 1 depicts an application architecture for enabling the applications supporting the edge computing system as defined in TR 23.758 and TS 23.558 according to the related art.

Referring to FIG. 1, an EDGE-4 reference point enables interactions between an Edge Enabler Client (EEC) of the UE and an Edge Configuration Server (ECS). The EDGE-4 interface is a Ua* interface defined in AKMA specification TS 33.535. The ECS provides supporting functions required for the EEC to connect with an Edge Enabler Server (EES). The EDGE-4 reference point supports provisioning of edge configuration information (e.g., a Uniform Resource Identifier (URI) or Local Area Data Network (LADN) service information) to the EEC. The EEC performs the functionalities like configuration information retrieval from the ECS over the EDGE-4 interface.

As per the TS 23.558, the ECS may be deployed in an MNO domain or may be deployed in a 3rd party domain by a service provider in which the EEC may communicate with one or more ECS(s) concurrently. If the ECS deployed by the MNO is contracted with one or more Edge Computing Service Providers ECSP(s), the ECS provides EES configuration information of MNO owned and ECSP owned EESs via MNO ECS as described in a clause 8.3.3.2. If the ECS is deployed by a non-MNO ECSP, the ECS endpoint address may be configured with the EEC. The EEC that is aware of multiple ECSP's ECS endpoint addresses may perform the service provisioning procedure per ECS of each ECSP multiple times.

In the edge computing system, the UE/EEC may communicate the ECS for accessing the edge computing services. The EEC and the ECS when first communicating with each other use a Transport Layer Security (TLS) protocol or an Internet Key Exchange version 2 (IKEv2) or an Extensible Authentication Protocol (EAP) procedure.

The TLS protocol provides a TLS handshake feature that allows peers/UEs to negotiate a TLS protocol version, select cryptographic algorithms, optionally authenticate each other, and establish a shared secret keying material. Once the handshake is complete, the peers use established keys to protect an application-layer traffic. Similarly, the IKEv2 is a component of an Internet Protocol Security (IPsec) protocol used for performing mutual authentication and establishing and maintaining Security Associations (SAs). The IKEv2 performs a mutual authentication between the UE and the ECS and establishes an IKE SA that includes shared secret information, which may be used to efficiently establish the SAs. The EAP procedure/framework specified in an RFC 3748 is used for authentication between the UE and the ECS in an external data network. A fifth generation (5G) core network initiates the authentication and establishes a Protocol Data Unit (PDU) session, as detailed in TS 33.501.

For enabling the edge computing services between the EEC and the ECS (either using the TLS protocol or the IKEv2 or the EAP procedure), it is required to verify an authenticity of the EEC and the ECS (i.e., a mutual authentication between the entities) before the actual communication. To perform the mutual authentication between the EEC and the ECS, it is required to establish security credentials. However, conventional approaches do not disclose how to enable the mutual authentication by provisioning the required security credentials for the EEC and the ECS and based on successful authentication and authorization of the EEC and the ECS, establishing a secure connection, for the usage of the edge computing services.

Further, for the secure connection establishment between the EEC and the ECS using the TLS protocol, as per the RFC, it is sufficient to verify the authenticity of the ECS only and for the EEC is optional. In the conventional approaches, a secure TLS connection between the EEC and the ECS may be established using the ECS server side certificate and the EEC is authenticating using a message authentication code (MAC-1). However, such an authentication and establishment of the secure TLS connection between the EEC and the ECS may not be effective.

Also, the secure connection establishment procedure may teardown the session due to unavailability of the security credentials. Further, the time taken to establish the security credentials may not be within a tolerable threshold, if the security credentials are established during the secure connection establishment procedure. Therefore, there is a need to addresses provisioning of the security credentials in entities (for example, the EEC, the ECS, or the like), while or before performing the secure connection establishment.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for authentication and establishment of secure connection for accessing edge computing services.

Another aspect of the disclosure is to provide methods and systems for dynamically deriving a Pre-shared key (PSK) and use the dynamically derived PSK for the authentication and establishment of the secure connection between a User Equipment (UE) and a server for accessing the edge computing services, wherein the UE includes an Edge Enabler Client (EEC), and the server includes an Edge Configuration Server (ECS).

Another aspect of the disclosure is to provide methods and systems for sending an application key identifier (ID) by the UE to the server or an Edge Enabler Server (EES) in a first message or a second message and initiating a secure connection establishment procedure by the UE with the server to establish the secure connection, based on the first message or the second message used for sending the application key ID to the server, wherein the first message is a TLS protocol message carrying the application key ID and the second message is a service provisioning request.

In accordance with an aspect of the disclosure, a method for authentication and establishment of secure connection for accessing edge computing services is provided. The method includes performing, by a User Equipment (UE), an authentication with a core network (CN) using subscription credentials. The method includes deriving, by the UE, an edge configuration server specific key ($K_{ECS}$) for at least one edge computing service, on performing the authentication with the CN. The method includes initiating, by the UE, a secure connection establishment procedure with a server by establishing a pre-shared key (PSK) based on the derived edge configuration server specific key ($K_{ECS}$), for the establishment of the secure connection for accessing the at least one edge computing service.

In accordance with another aspect of the disclosure, an edge computing system is provided. The edge computing system includes a server and a User Equipment (UE) coupled to the server. The server configured to perform an authentication with a core network (CN) using subscription credentials. The server is configured to derive an edge configuration server specific key ($K_{ECS}$) for at least one edge computing service, on performing the authentication with the CN. The server is configured to initiate a secure connection establishment procedure with a server by establishing a pre-shared key (PSK) based on the derived edge configuration server specific key ($K_{ECS}$), for establishment of a secure connection for accessing the at least one edge computing service.

In accordance with another aspect of the disclosure, a User Equipment (UE) in an edge computing system is provided. The UE includes an application client and an Edge Enabler Client (EEC) coupled to the application client. The EEC is configured to perform an authentication with a core network (CN) using subscription credentials. The EEC is configured to derive an edge configuration server specific key ($K_{ECS}$) for at least one edge computing service, on performing the authentication with the CN. The EEC is configured to send an application key identifier (ID) to a server in a first message or in a second message. The EEC is configured to initiate a secure connection establishment procedure with the server and derive a pre-shared key (PSK) using the edge configuration server specific key ($K_{ECS}$) or use the edge configuration server specific key ($K_{ECS}$) as the PSK for the at least one edge computing service, based on the first message or the second message used for sending the application key ID. The EEC is configured to enable performing of a mutual authentication between the UE and the server using the PSK, to establish a secure connection for the at least one edge computing service.

In accordance with another aspect of the disclosure, a server in an edge computing system is provided. The server includes a memory and a controller coupled to the memory. The controller is configured to receive an application key identifier (key ID) from a User Equipment (UE) for at least one edge computing service. The controller is configured to fetch an edge configuration server specific key ($K_{ECS}$) from an application anchor function for the received application key ID. The controller is configured to derive a pre-shared key (PSK) based on the fetched edge configuration server specific key ($K_{ECS}$) or use the edge configuration server specific key ($K_{ECS}$) as the PSK. The controller is configured to enable performing of a mutual authentication between the UE and the server using the PSK, to establish a secure connection for the at least one edge computing service.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B depict a service provisioning request and a service provisioning response, respectively, according to various embodiments of the disclosure;

Throughout the drawings, it should be noted that like reference numbers are used to depict the same or similar elements, features, and structures.

DETAILED DESCRIPTION

Figure 1:
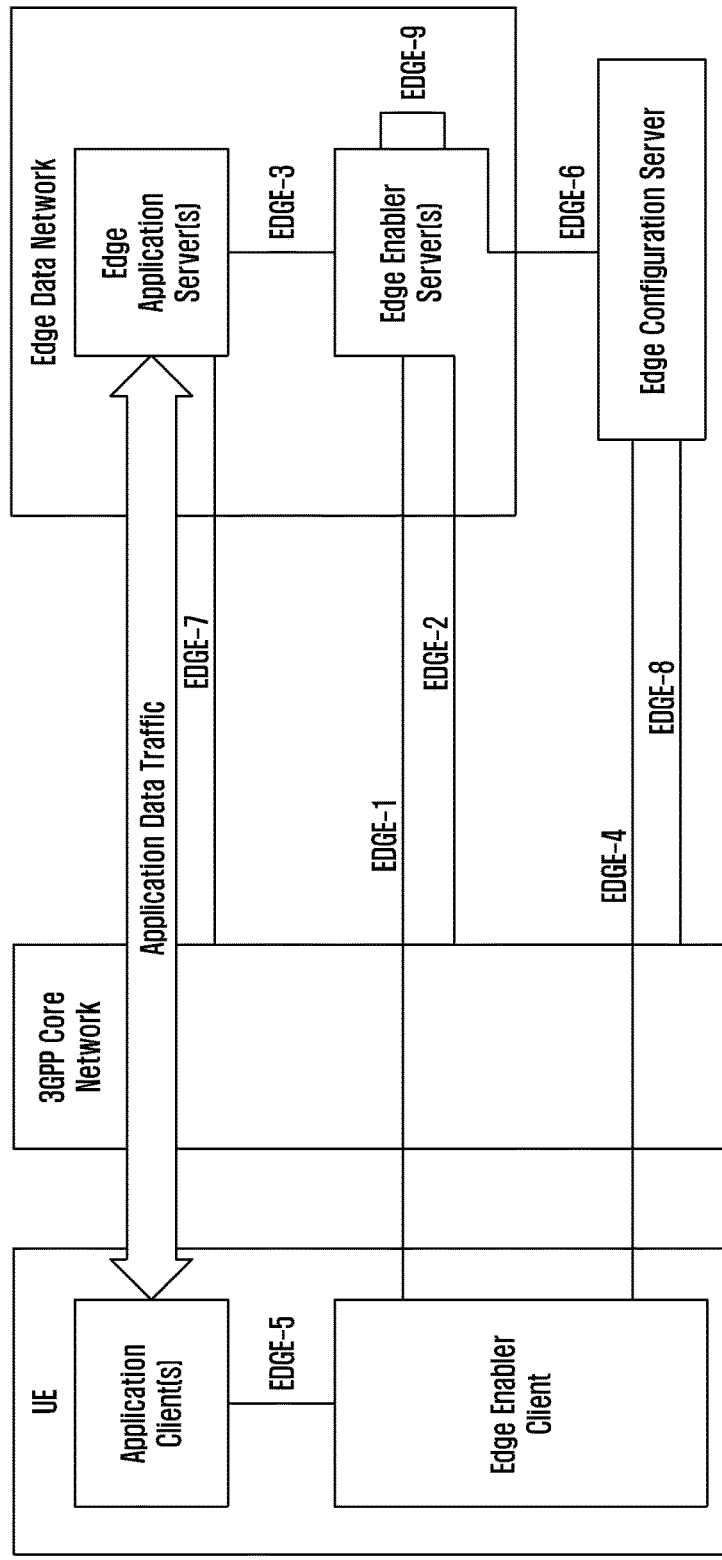
FIG. 1 depicts an application architecture for enabling applications supporting an edge computing system without defining a mechanism to enable authentication and establishment of secure connection for accessing edge computing services according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose how to enable an authentication prior to an actual communication between a UE/client and a server, by provisioning required credentials and establish a secure session/connection between the UE and the server for accessing edge computing services, based on a successful authentication and authorization of the UE and the server. The UE includes an Edge Enabler Client (EEC), and the server includes an Edge Configuration Server (ECS).

Embodiments herein use an Authentication and Key Management for Applications (AKMA) network service for the authentication and authorization of the UE and the server for the edge computing services. The AKMA network service establishes the required credentials between the UE and the server to perform the authentication and to establish the secure connection for the edge computing services. The UE derives a Pre-shared (PSK) key based on an AKMA application key and indicates an AKMA key identifier (ID) to the server to establish a secure Transport Layer Security (TLS) connection/session with the server for the edge computing services. In an example, the UE indicates the AKMA key ID to the server in Transport Layer Security messages. In another example, the UE indicates the AKMA key ID to the server in a service provisioning request. Based on the indicated AKMA key ID, the server obtains the PSK by contacting an AKMA anchor function (AAnF) using information in the AKMA key ID. Once the server obtains the PSK, a mutual authentication is performed between the UE and the server using the PSK and the secure TLS connection/session is established between the UE and the server based on the successful authentication and authorization of the UE and the server.

Embodiments herein use network access credentials (Subscription credentials/Universal Subscriber Identity Module (USIM) credentials) for edge computing user authentication and authorization. After a successful authentication procedure, embodiments herein issue/derive a temporary key (e.g., Access token or security Key) for authorizing the access to an Edge Enabler Server (EES). With the temporary key, a Mobile Network Operator (MNO) has a capability to control whether or not the UE has access to the edge computing services and may access each EES(s). In an embodiment herein, an edge computing system may have multiple EESs; and each EES is owned by an edge computing service provider respectively. In an embodiment, there may be multiple edge computing service providers.

Referring now to the drawings, and more particularly to FIGS. 2 to 7, 8A, 8B, 9, and 10, where similar reference characters denote corresponding features consistently throughout the figures, there are shown example embodiments.

The clause number references mentioned throughout the document are subject to change as and when such referenced documents are updated, but the document numbers, such as TS 23.558, or the like, are definitive.

Figure 2:
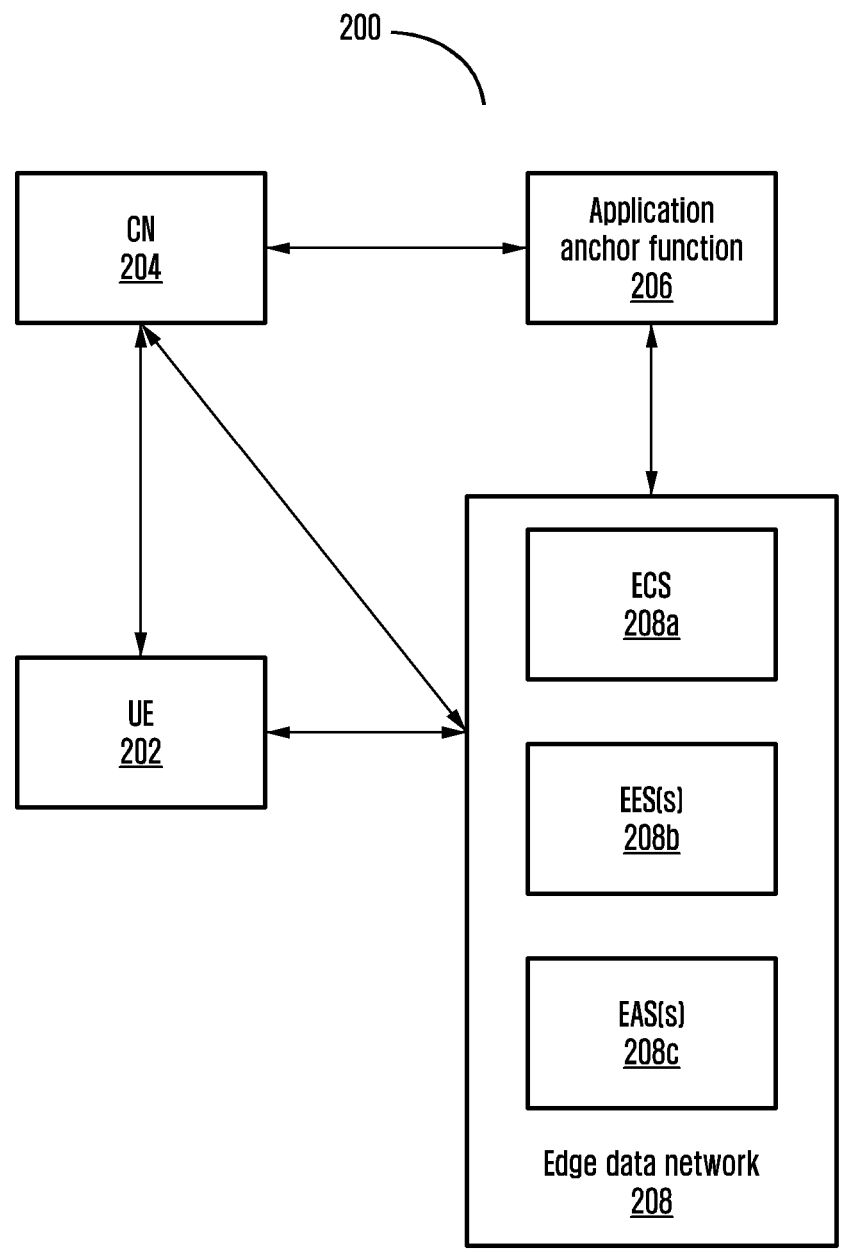
FIG. 2 depicts an edge computing system, according to an embodiment of the disclosure.

FIG. 2 depicts an edge computing system 200, according to an embodiment of the disclosure.

Referring to FIG. 2, the edge computing system 200 referred herein may be configured to provide edge computing services by deploying edge servers near to user devices. Examples of the edge computing services may be, but are not limited to, a voice service session, a live streaming service session, a real time gaming service session, a buffered streaming service session, a Transport Control Protocol (TCP) based session (for example, an email, a messaging service, a file transferring service, and so on), an Internet Protocol (IP) Multimedia Subsystem (IMS) service, and so on. The edge computing system 200 provides advantages such as, but are not limited to, efficient service delivery with significant reduction in end-to-end latency, decreased load on a transport network, and so on. Due to such advantages, the edge computing system 200 may be used in applications such as, but are not limited to, virtual and augmented reality (VR/AR) related applications, an Internet of Things (IoT) applications, industrial applications, autonomous driving applications, real-time multiplayer gaming applications, and so on.

The edge computing system 200 includes one or more User Equipments (UEs)/user devices 202, one or more core networks (CNs) 204, an application anchor function 206, and an edge data network 208.

The UE(s) 202 may be a user device capable of accessing the edge computing services. Examples of the UE 202 may be, but are not limited to, a mobile phone, a smartphone, a tablet, a phablet, a personal digital assistant (PDA), a laptop, a computer, a wearable computing device, a vehicle infotainment device, an IoT device, a Wireless Fidelity (Wi-Fi) router, a USB dongle, or any other device capable of accessing the edge computing services. The UE 202 may be connected to the CN 204 through one or more Base Stations (BSs) associated with the CN 204. The UE 202 may also be connected to the edge data network 208 according to $3^{rd}$ Generation Partnership Project (3GPP) TS 23.558. Embodiments herein use the terms such as, "UE", "client", "user device", "Edge Enabler Client (EEC)", and so on, interchangeably to refer to a device capable of accessing the edge computing services.

The CN(s)/3GPP core network 204 may support one or more different Radio Access Technologies (RATs). Examples of the RATs may be, but are not limited to, a 3rd Generation Partnership Project (3GPP), a Long Term Evolution (LTE/4G), an LTE-Advanced (LTE-A), a Fifth Generation (5G) New Radio (NR), a Wireless Local Area Network (WLAN), Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), a Wireless Local Area Network (WLAN), Worldwide Interoperability for Microwave Access (WiMAX/IEEE 802.16), Wi-Fi (IEEE 802.11), Evolved-UTRA (E-UTRA), Wi-Fi Direct, or any other next generation network. In an example, the CN 204 may be an Evolved Packet Core (EPC) supporting the LTE network. In another example, the CN 204 may be a fifth generation (5G) core network (5GC). The CN 204 may connect to the UE 202 through associated one or more Base Stations (BSs)/Radio Access Networks (RANs) (not shown). The CN 204 may be configured to provide authentication services and other security related services to the UE 202, while the UE 202 initiates a process for accessing the edge computing services.

The application anchor function 206 may be Authentication and Key Management for Applications (AKMA) anchor function (AAnF) in a Home Public Land Mobile Network (HPLMN). In an example, the application anchor function 206 may be deployed as a standalone function. In another example, the application anchor function 206 may be deployed by collocating with functions of the CN 204 or with Network Exposure Function (NEF) according to operator's deployment scenarios. The application anchor function 206 may be configured to generate key material which may be used during the authentication and establishment of secure connection between the UE 202 and the edge data network 208 for the edge computing services. Embodiments herein use the terms such as "application anchor function", "AAnF", and so on, interchangeably through the document.

The edge data network 208 includes an Edge Configuration Server (ECS) 208a, one or more Edge Enabler Servers (EESs) 208b, and one or more Edge Application Servers (EASs) 208c. The ECS 208a may be connected to the EEEs 208b, the CN 204, and the UE 202 through an EDGE-6 interface, an EDGE-8 interface, and an EDGE-4 interface, respectively. The EESs 208b may be connected to each other using an EDGE-9 interface. The EES 208b may be connected to the EASs 208c, the CN 204, and the UE 202 through an EDGE-3 interface, an EDGE-2 interface, and an EDGE-1 interface, respectively. The EASs 208c may be connected to the UE 202 through an EDGE-7 interface. An application data traffic may be exchanged between the UE 202 and the EAS 208c for the edge computing services.

The ECS 208a may be an Application Function (AF) for the AAnF 206 (as specified in the 3GPP TS 33.535). The ECS 208a may be configured to provide configurations to the UE 202 to connect with the EAS 208c for accessing the edge computing services. Embodiments herein use the terms "ECS", "server", "AF", "OAuth server", and so on, interchangeably through the document. The EES 208b may be configured to enable discovery of the EASs for the UE 202 to access the edge computing services. The EAS 208c may be configured to provide the edge computing services to the UE 202.

An architecture of the edge computing system 200, functions of the components of the edge computing system 200, or the like may be intuitively inferred by one of ordinary skill in the art by referring to the 3GPP TS 23.558, and thus, detailed description corresponding to the components of the edge computing system 200 is omitted.

Embodiments herein enable authentication and establishment of the secure connection between the UE 202 and the ECS 208a for accessing the edge computing services.

When the UE 202 wants to access the edge computing services, the UE 202 performs an authentication with the CN 204 using subscription credentials. In an example, the subscription credentials may include security credentials/Universal Subscriber Identity Module (USIM) credentials provided by a Mobile Network Operator (MNO) to access the CN 204/RAT supported by the CN 204. In an example, the authentication performed with the CN 204 may be a primary network access authentication procedure as specified in the 3GPP TS 33.501, clause 6.1. On performing the authentication with the CN 204, the UE 202 and the CN 204 generate an authentication server function key. In an example, if the CN 204 is a 5GC, then the authentication server function key may be a key $K_{AUSF}$.

On generating the authentication server function key, the CN 204 derives an authentication and authorization key. In an example, the authentication and authorization key may be an AKMA key ($K_{AKMA}$). The CN 204 may derive the authentication and authorization key/AKMA key ($K_{AKMA}$) in accordance with the 3GPP TS 33.535. The CN 204 communicates the derived authentication and authorization key/AKMA key ($K_{AKMA}$) to the AAnF 206 in a key response.

On generating the authentication server function key, the UE 202 derives the authentication and authorization key/AKMA key ($K_{AKMA}$), in accordance with the 3GPP TS 33.535. The UE 202 also derives further keys such as, but are not limited to, an edge configuration server specific key ($K_{ECS}$), or the like, for the one or more edge computing services. In an embodiment, the edge configuration server specific key ($K_{ECS}$) may be an AKMA application key ($K_{AF}$). The UE 202 derives the edge configuration server specific key ($K_{ECS}$) based on the authentication and authorization key/AKMA key ($K_{AKMA}$) (as specified in the 3GPP TS 33.535). If the UE 202 holds a valid edge configuration server specific key ($K_{ECS}$) for the ECS 208a, the UE does not perform a step of deriving the edge configuration server specific key ($K_{ECS}$).

In accordance with the 3GPP TS 33.535, the UE 202 derives the edge configuration server specific key ($K_{ECS}$)/AKMA application key ($K_{AF}$) using a key derivation function (KDF) (which has been specified in the 3GPP TS 33.220). The UE 202 computes the edge configuration server specific key ($K_{ECS}$)/AKMA application key ($K_{AF}$) (as per clause A.4) as:

$$K_{AF} = KDF(K_{AKMA}, AF\_ID)$$

wherein the AF_ID may be constructed as:

AF_ID=FQDN of AF||Ua* security protocol identifier wherein, the Ua* security protocol identifier may be specified as a Ua security protocol identifier in an Annex H of the 3GPP TS 33.22. A key used for deriving the AKMA application key ($K_{AF}$)/($K_{ECS}$) is the AKMA key ($K_{AKMA}$). The FQDN (Fully Qualified Domain Name) of the AF/ECS 208a may be configured in the UE 202 as part of an ECS address information. Alternatively, if an Internet Protocol (IP) address is configured, then instead of the FQDN, the UP address may be used for constructing the AF_ID. The FQDN or the IP address of the AF/ECS 208a may be configured in the UE 202 using a Protocol Configuration Options (PCO) message received from the CN 204.

Embodiments herein use the terms "the edge configuration server specific key ($K_{ECS}$)", "AKMA application key ($K_{AF}$)", and so on, interchangeably through the document.

On deriving the edge configuration server specific key ($K_{ECS}$) for the one or more edge computing services, the UE 202 initiates a secure connection establishment procedure with the ECS 208a by dynamically establishing a pre-shared key or using the edge configuration server specific key ($K_{ECS}$) for the authentication and establishment of the secure connection for accessing the edge computing services. The pre-shared key may be established based on the edge configuration server specific key ($K_{ECS}$). Establishing the secure connection involves establishing a secure channel between the UE 202 and the ECS 208a for the edge computing services. In an embodiment, the secure connection establishment procedure includes a TLS connection/session establishment procedure, and the secure connection includes a secure TLS connection/session.

The UE 202 initiates the secure connection establishment procedure based on sending an application key identifier (ID) to the ECS 208a. In an embodiment, the application key ID may be an AKMA key ID. The application key ID indicates the authentication and authorization key/AKMA key ($K_{AKMA}$) used for deriving the edge configuration server specific key ($K_{ECS}$). Embodiments herein use the terms such as "application key ID", "AKMA key ID", "A-KID", "AKMA-ID", and so on, interchangeably through the document.

In an embodiment, the UE 202 may send the application key ID to the ECS 208a in a first message/TLS protocol message by parallelly initiating the secure connection establishment procedure with the ECS 208a. Thus, the UE 202 may send the application key ID to the ECS 208a as part of the secure establishment procedure. Sending the application key ID to the ECS 208a in the TLS protocol message includes sending EEC details to the ECS 208a in the TLS protocol message. In an example, the TLS protocol message may include a "Client Hello message", or the like. The EEC details may be carried in a vendor ID payload within the TLS protocol message. The EEC details may include an EEC ID, a UE ID, and the application key ID. On receiving the application key ID from the UE 202 in the TLS protocol message, the ECS 208a sends a key request including the received application key ID to the AAnF 206 to identify an application security context in the AAnF 206 for fetching the edge configuration server specific key ($K_{ECS}$). The AAnF 206 derives the edge configuration server specific key ($K_{ECS}$) using the authentication and authorization key/AKMA key ($K_{AKMA}$) corresponding to the application key ID received from the ECS 208a. The AAnF 206 sends the derived edge configuration server specific key ($K_{ECS}$) to the ECS 208a. Once the edge configuration server specific key ($K_{ECS}$) is available at the UE 202 and the ECS 208a, the UE 202 and the ECS 208a derive the PSK. In an embodiment, the UE 202 and the ECS 208a may derive the PSK as a KDF of the edge configuration server specific key ($K_{ECS}$) and other possible parameters. Examples of the parameters may be, but are not limited to, a Function Code (FC) value, a Generic Public Subscription Identifier (GPSI), an EEC ID, an ECS ID, a text string like "PSK", a freshness parameter, and so on. In an embodiment the freshness parameter is a counter value maintained by the EEC 310 of the UE 202. In another embodiment, the UE 202 and the ECS 208a may use the edge configuration server specific key ($K_{ECS}$) as the PSK. On deriving the PSK, the UE 202 and the ECS 208a perform the mutual authentication using the PSK to establish the secure connection/secure channel for accessing the edge computing services.

In another embodiment, the UE 202 may send the application key ID to the ECS 208a in a second message/service provisioning request. In an example, the service provisioning request includes the EEC ID, security credentials, the application key ID, an application client profile(s) of the UE 202, the UE ID, connectivity information, a UE location, or the like. On receiving the application key ID from the UE 202 in the service provisioning request, the ECS 208a fetches the edge configuration server specific key ($K_{ECS}$) by communicating with the AAnF 206. Once the edge configuration server specific key ($K_{ECS}$) is available at the UE 202 and the ECS 208a, the UE 202 and the ECS 208a may derive the PSK as the KDF of the edge configuration server specific key ($K_{ECS}$) and other possible parameters. Alternatively, the UE 202 and the ECS 208a may use the edge configuration server specific key ($K_{ECS}$) as the PSK. On deriving the PSK, the ECS 208a sends a request to the UE 202 to initiate the secure connection establishment procedure. The UE 202 initiates the secure connection establishment procedure with the ECS 208a, based on the request received from the UE 202. After initiating the secure connection establishment procedure, the UE 202a and the ECS 208a perform the mutual authentication using the PSK to establish the secure connection for accessing the edge computing services.

On establishing the secure connection, the ECS 208a provides authorization credentials to the UE 202 in response to the service provisioning request over the established secure connection. In an example, the authorization credentials may include an access token corresponding to the EES 208b for which the UE 202 has authorization to access.

On receiving the access token from the ECS 208a for the EES 208b, the UE 202 performs an EEC registration (as specified in clause 8.4.2 in TS 23.558 [2]) and discovery (as specified in clause 8.5 in TS 23.558 [2]) with the EES 208b using the received access token to obtain an access for the one or more EASs 208c. On receiving the access from the EES 208b for the one or more EASs 208c, the UE 202 access the one or more edge computing services from the one or more EASs 208c.

FIG. 2 shows blocks of the edge computing system 200, but it is to be understood that other embodiments are not limited thereon. In other embodiments, the edge computing system 200 may include less or more number of blocks. Further, the labels or names of the blocks are used only for illustrative purpose and does not limit the scope of the embodiments herein. One or more blocks can be combined together to perform same or substantially similar function in the edge computing system 200.

Figure 3:
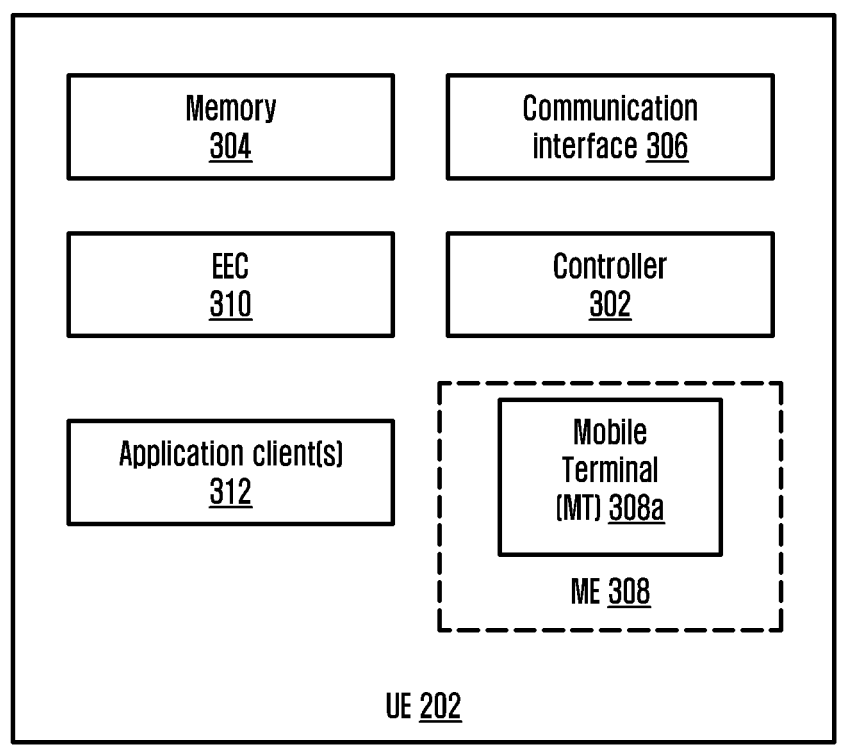
FIG. 3 is a block diagram depicting components of a User Equipment (UE) for accessing the edge computing services, according to an embodiment of the disclosure.

FIG. 3 is a block diagram depicting components of the UE 202 for accessing the edge computing services, according to an embodiment of the disclosure.

Referring to FIG. 3, the UE 202 includes a controller 302, a memory 304, a communication interface 306, a Mobile Equipment (ME) 308, the EEC 310, and one or more application clients 312. The UE 202 may also include at least one of, a transceiver, a processing circuitry, communication ports, a display, Input/Output (I/O) ports, and so on (not shown).

The controller 302 may be configured to control components 304-312 of the UE 202. The controller 302 includes at least of, a single processer, a plurality of processors, multiple homogeneous or heterogeneous cores, multiple Central Processing Units (CPUs) of different kinds, microcontrollers, special media, and other accelerators.

The memory 304 may store at least one of, the authentication key, the authentication and authorization key/AKMA key ($K_{AKMA}$), the edge configuration server specific key ($K_{ECS}$), the PSK, the access tokens, and so on. Examples of the memory 304 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 304 may include one or more computer-readable storage media. The memory 304 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 304 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 306 may be configured to enable the UE 202 to communicate with the CN 204 using an interface supported by the one or more RATs. Examples of the interface may be at least one of, but is not limited to, a wired or wireless fronthaul interface, a wired or wireless backhaul interface, or any structure supporting communications over a wired or wireless connection. The communication interface 306 may also be configured to enable the UE 202 to communicate with the edge data network 208 using various EDGE interfaces (as specified in the 3GPP TS 23.558 [2]).

The ME 308 includes a Terminal Equipment (TE) (not shown), and a Mobile Terminal (MT) 308a. Radio access protocols may work on the MT 308a, and control functions of the MT 308a may work on the TE. The MT 308a may be configured to initiate the authentication/primary network access authentication procedure with the CN 204, when the UE 202 wants to access the edge computing services from the one or more EASs 208c. On completion of the network access authentication procedure with the CN 204, the MT 308a generates the authentication key ($K_{AUSF}$). The MT 308a stores the generated authentication key ($K_{AUSF}$) in the memory 304.

The EEC 310 may be configured on the UE 202 by at least one of, the application client(s) 312 (i.e., an edge-aware application client), a user, an MNO through a 5GC procedure, and so on. The EEC 310 may also be configured based on at least one of, a HPLMN identifier derived for non-roaming scenarios, a Visitor Public Land Mobile Network (VPLMN) identifier derived for roaming scenarios, and so on. The EEC 310 may be configured to provide support functions to the application client(s) 312 for accessing the edge computing services from the one or more EASs 208c. In an example, the support functions may include, but is not limited to, the discovery of the one or more EASs for the application client(s) 312, or the like.

For providing the support functions to the application client(s) 312, the EEC 310 may establish the secure connection with the ECS 208a and the EES 208b. For establishing the secure connection with the ECS 208a, the EEC 310 derives the AKMA key ($K_{AKMA}$), on generating the authentication key ($K_{AUSF}$) by the MT 308a. The EEC 310 also derives the edge configuration server specific key ($K_{ECS}$)/AKMA application key ($K_{AF}$) based on the AKMA key ($K_{AKMA}$).

On deriving the edge configuration server specific key ($K_{ECS}$), the EEC 310 sends the application key ID to the ECS 208a. In an embodiment, the EEC 310 sends the application key ID to the ECS 208a in the TLS protocol message by initiating the secure connection establishment procedure with the ECS 208a. In such a scenario, on initiating the secure connection establishment procedure with the ECS 208a, the EEC 310 derives the PSK based on the edge configuration server specific key ($K_{ECS}$) or uses the edge configuration server specific key ($K_{ECS}$) as the PSK. On deriving the PSK, the EEC 310 enables performing of the mutual authentication between the UE 202 and the ECS 208a using the PSK to establish the secure connection for accessing the edge computing services.

In another embodiment, the EEC 310 sends the application key ID to the ECS 208a in the service provisioning request. In such a scenario, the EEC 310 derives the PSK based on the edge configuration server specific key ($K_{ECS}$) or uses the edge configuration server specific key ($K_{ECS}$) as the PSK, on sending the service provisioning request to the ECS 208a. The EEC 310 further receives the request from the ECS 208a to initiate the secure connection establishment procedure, when the ECS 208a derives the PSK. On receiving the request from the ECS 208a, the EEC 310 initiates the secure connection establishment procedure with the ECS 208a. On initiating the secure connection establishment procedure, the EEC 310 enables performing of the mutual authentication between the UE 202 and the ECS 208a using the PSK to establish the secure connection for accessing the edge computing services.

In an example, the EEC 310 may derive the PSK as the KDF of the edge configuration server specific key ($K_{ECS}$) and other possible parameters such as, but are not limited to, the FC value, the GPSI, the EEC ID, the ECS ID, the text string like "PSK", the freshness parameter, and so on. In an embodiment the freshness parameter is the counter value maintained by the EEC 310. In another example, the EEC 310 may use the edge configuration server specific key ($K_{ECS}$) as the PSK.

In an example, performing the mutual authentication between the UE 202 and the ECS 208a involves sending, by the EEC 310, the derived PSK to the ECS 208a and receiving the PSK of the ECS 208a. The EEC 310 authenticates the ECS 208a based on the received PSK from the ECS 208a. The PSK sent by the EEC 310 may be used by the ECS 208a to authenticate the EEC 310. Once the EEC 310 and the ECS 208a have been authenticated and authorized successfully, the secure connection/TLS session may be established between the EEC 310/UE 202 and the ECS 208a.

The EEC 310 may also be configured to initiate the service provisioning procedure with the ECS 208a, on establishing the secure connection/TLS session with the ECS 208a. In response to the initiated service provisioning procedure, the EEC 310 may receive the access token for the EES 208b from the ECS 208a, if the UE 202 is authorized to access the respective EES 208b.

The EEC 310 may also be configured to perform the EEC registration and discovery with the EES 208b using the received access token to discover the one or more EASs 208c. The EEC 310 provides information about the discovered one or more EASs 208c to the application client(s) 312 for accessing the edge computing services.

The application client(s) 312 may be configured to access the edge computing services from the one or more EASs 208c, on discovering the one or more EASs 208c by the EEC 310.

FIG. 3 shows blocks of the UE 202, but it is to be understood that other embodiments are not limited thereon. In other embodiments, the UE 202 may include less or more number of blocks. Further, the labels or names of the blocks are used only for illustrative purpose and does not limit the scope of the embodiments herein. One or more blocks can be combined together to perform same or substantially similar function in the UE 202.

Figure 4:
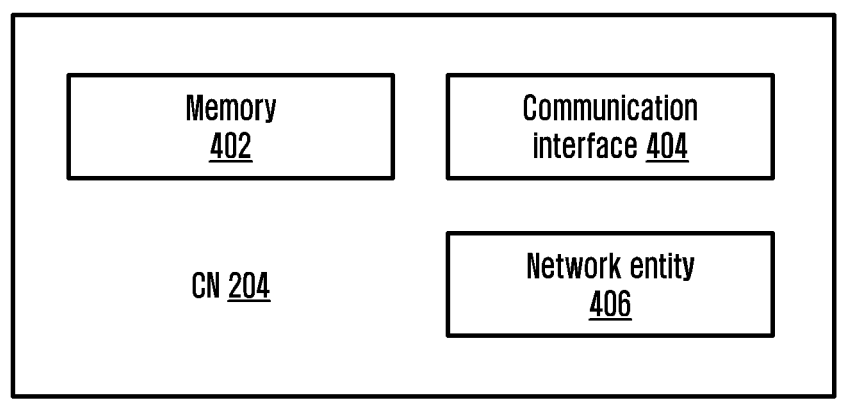
FIG. 4 is an example block diagram depicting components of a core network (CN), according to an embodiment of the disclosure.

FIG. 4 is an example block diagram depicting components of the CN 204, according to an embodiment of the disclosure.

Referring to FIG. 4, the CN 204 may include at least one of, but is not limited to, an EPC, a 5GC network, and so on. The CN 204 includes a memory 402, a communication interface 404, and a network entity 406.

The memory 402 may store at least one of, information about the UE 202, the edge data network 208, the AAnF 206, or the like, the authentication key ($K_{AUSF}$), and so on. Examples of the memory 402 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 402 may also include one or more computer-readable storage media. The memory 402 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 402 may, in some examples, be considered a non-transitory storage medium. The term "non-transitory" may indicate that the storage medium is not embodied in a carrier wave or a propagated signal. However, the term "non-transitory" should not be interpreted to mean that the memory 402 is non-movable. In some examples, the memory 402 can be configured to store larger amounts of information than the memory. In certain examples, a non-transitory storage medium may store data that can, over time, change (e.g., in Random Access Memory (RAM) or cache).

The communication interface 404 may be configured to enable the CN 204 to communicate with the UEs 202 through the associated BSs using an interface supported by the one or more RATs, Examples of the interface may be at least one of a wired or wireless fronthaul interface, a wired/non-radio or wireless/radio interface, or any structure supporting communications over a wired or wireless connection. The communication interface 404 may also be configured to enable the CN 204 to communicate with the edge data network 208 using the various EDGE interfaces.

The network entity 406 may be a core functional element/module that depends on the RAT supported by the CN 204. In an example, if the CN 204 supports a 5G network, the network entity 406 may be an Authentication Server Function (AUSF). The network entity/AUSF 406 may be configured to provide the authentication services and the other security related services to the UE 202, when the UE 202 wants to access the edge computing services from the edge data network 208.

The network entity/AUSF 406 may be configured to generate the authentication key ($K_{AUSF}$), on completion of the network access authentication procedure initiated by the UE 202 with the CN 204. The network entity/AUSF 406 may also be configured to derive the AKMA key ($K_{AKMA}$), on generating the authentication key $K_{AUSF}$. The network entity/AUSF 406 provides the derived AKMA key ($K_{AKMA}$) to the AAnF 206. The AKMA key ($K_{AKMA}$) may be used by the AAnF 206 to derive the edge configuration server specific key ($K_{ECS}$)/AKMA application key ($K_{ECS}$).

FIG. 4 shows blocks of the CN 204, but it is to be understood that other embodiments are not limited thereon. In other embodiments, the CN 204 may include less or more number of blocks. Further, the labels or names of the blocks are used only for illustrative purpose and does not limit the scope of the embodiments herein. One or more blocks can be combined together to perform same or substantially similar function in the CN 204.

Figure 5:
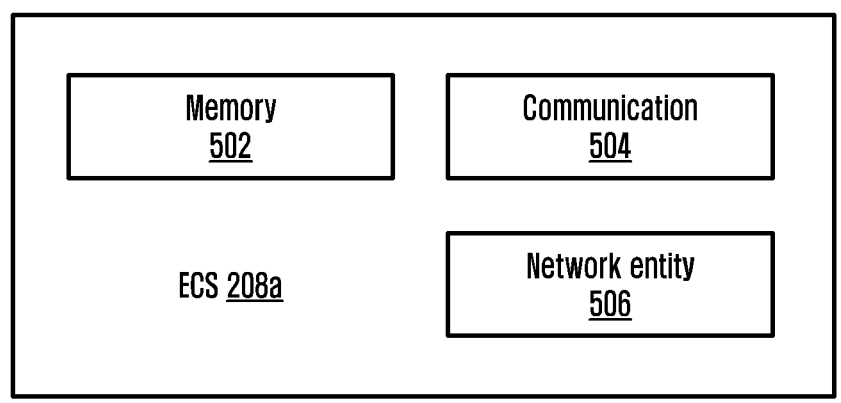
FIG. 5 is an example block diagram depicting components of an Edge Configuration Server (ECS), according to an embodiment of the disclosure.

FIG. 5 is an example block diagram depicting components of the ECS 208a, according to an embodiment of the disclosure.

Referring to FIG. 5, the ECS 208a includes a memory 502, a communication interface 504, and a controller 506.

The memory 502 may store at least one of, the authentication key, the AKMA key ($K_{AKMA}$), the edge configuration server specific key (KECS)/AKMA application key ($K_{ECS}$), the PSK, the access tokens, and so on. Examples of the memory 502 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. The memory 502 may also include one or more computer-readable storage media. The memory 502 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 502 may, in some examples, be considered a non-transitory storage medium. The term "non-transitory" may indicate that the storage medium is not embodied in a carrier wave or a propagated signal. However, the term "non-transitory" should not be interpreted to mean that the memory 502 is non-movable. In some examples, the memory 502 can be configured to store larger amounts of information than the memory. In certain examples, a non-transitory storage medium may store data that can, over time, change (e.g., in Random Access Memory (RAM) or cache).

The communication interface 504 may be configured to enable the ECS 208a to communicate with the UEs 202, the CN 204, and the AAnF 206 over the one or more EDGE interfaces (as specified in the 3GPP TS 23.558 [2]).

The controller 506 includes at least of, a single processer, a plurality of processors, multiple homogeneous or heterogeneous cores, multiple Central Processing Units (CPUs) of different kinds, microcontrollers, special media, and other accelerators.

The controller 506 may be configured to establish the secure connection/TLS session between the UE 202 and the ECS 208a, when the UE 202 wants to access the edge computing services.

For establishing the secure connection, the controller 506 may receive the application key ID from the UE 202. In an embodiment, the controller 506 may receive the application key ID from the UE 202 in the TLS protocol message, when the UE 202 initiates the secure connection establishment procedure with the ECS 208a. In such a scenario, the controller 506 fetches the edge configuration server specific key ($K_{ECS}$) from the AAnF 206 using the received application key ID and derives the PSK. On deriving the PSK, the controller 506 enables performing of the mutual authentication between the UE 202 and the ECS 208a using the PSK to establish the secure connection for accessing the edge computing services.

In another embodiment, the controller 506 may receive the application key ID in the service provisioning request. In such a scenario, the controller 506 fetches the edge configuration server specific key ($K_{ECS}$) from the AAnF 206 using the received application key ID and derives the PSK. On deriving the PSK, the controller 506 sends the request to the UE 202 to initiate the secure connection establishment procedure with the ECS 208a. When the UE 202 initiates the secure connection establishment procedure with the ECS 208a, the controller 506 enables performing of the mutual authentication between the UE 202 and the ECS 208a using the PSK to establish the secure connection for accessing the edge computing services.

In an example, the controller 506 may derive the PSK based on the edge configuration server specific key ($K_{ECS}$), and other parameters such as, but are not limited to, the FC value, the GPSI, the EEC ID, the ECS ID, the text string like "PSK", the freshness parameter, and so on. In another example, the controller 506 may use the edge configuration server specific key ($K_{ECS}$) as the PSK.

The controller 506 may also be configured to provide the access token corresponding to the EES 208b to the UE 202, when the UE 202 initiates the service provisioning procedure with the ECS 208a. The controller 506 provides the access tokens to the UE 202, only if the UE 202 is authorized to access the respective EES 208b.

FIG. 5 shows blocks of the ECS 208a, but it is to be understood that other embodiments are not limited thereon. In other embodiments, the ECS 208a may include less or more number of blocks. Further, the labels or names of the blocks are used only for illustrative purpose and does not limit the scope of the embodiments herein. One or more blocks can be combined together to perform same or substantially similar function in the ECS 208a.

Embodiments herein further explain the authentication and establishment of the secure connection between the UE 202 and the ECS 208a by considering that the UE 202 is connected to the 5GC 204, as an example, but it may be obvious to a person skilled in the art that the UE 202 may connect to any other CN 204. The 5GC 204 includes the AUSF 406.

Figure 6:
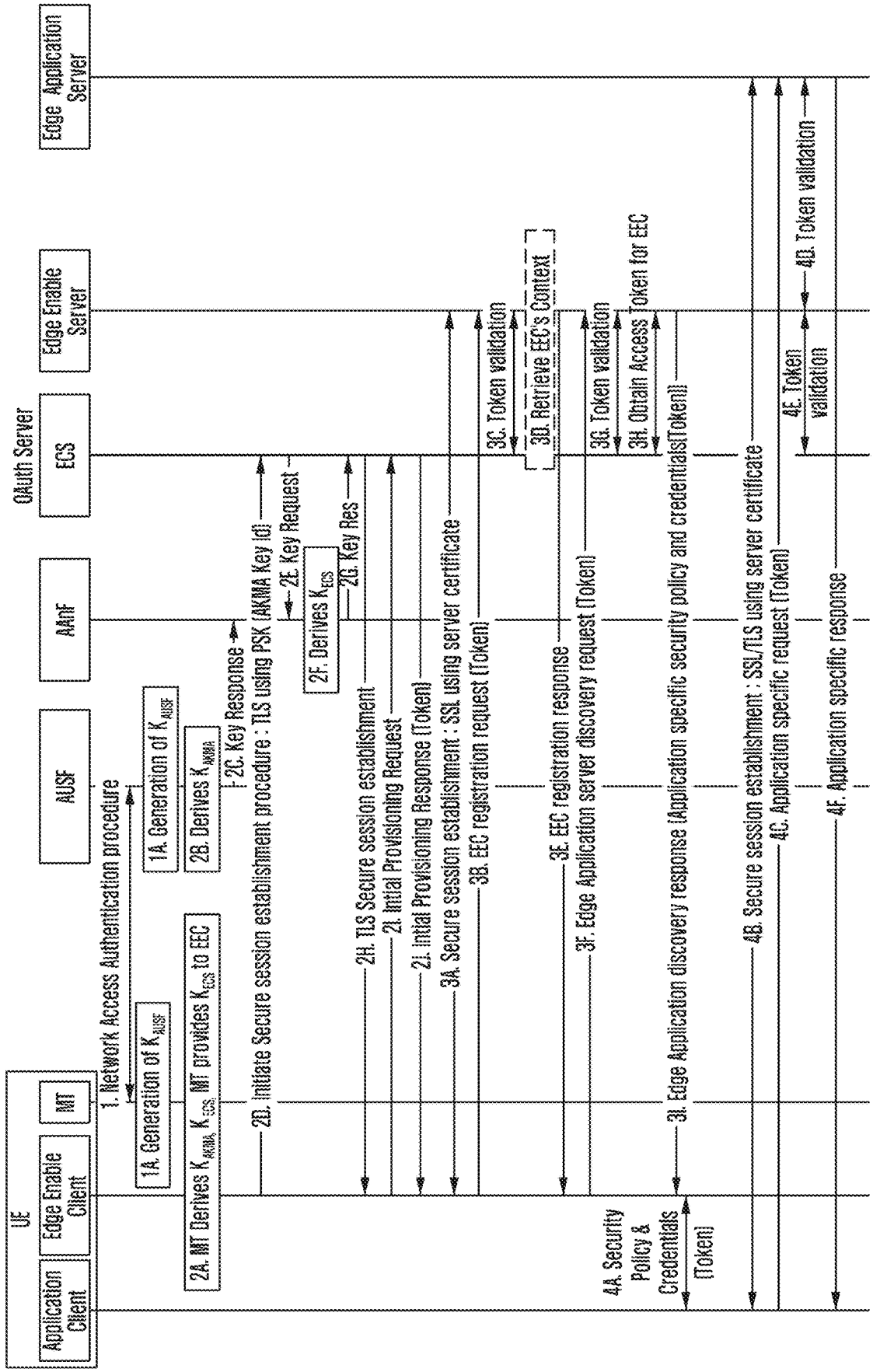
FIG. 6 depicts an example sequence diagram, where the UE and the server/ECS use a Transport Layer Security (TLS) with pre-shared key (PSK)-based authentication for securing a connection to access edge computing services, where details of an application key identifier is carried by TLS protocol messages to establish a PSK during a TLS establishment procedure, according to an embodiment of the disclosure.

FIG. 6 depicts an example sequence diagram, where the UE 202 and the server/ECS 208a use the TLS with PSK-based authentication for securing the connection to access the edge computing services, where details of the application key ID/AKMA key identity is carried by the TLS protocol messages to establish the PSK during the TLS session establishment procedure, according to an embodiment of the disclosure.

Referring to FIG. 6, at step 1, the MT 308a of the UE 202 performs procedures as defined in the 3GPP TS 23.502[5] to obtain the 5GC network access.

At step 1A, the MT 308a initiates the network access authentication procedure (i.e., a primary authentication and key agreement specified in the 3GPP TS 33.501, clause 6.1). On completion of the network access authentication procedure, the MT 308a and the AUSF 406 are in possession (successful generation) of the key $K_{AUSF}$.

At step 2A, the EEC 310 of the UE 202 derives the AKMA key as specified in the 3GPP TS 33.535 and optionally the further keys like the edge configuration server specific key ($K_{ECS}$) key ($K_{ECS}$) for the edge computing services. The edge configuration server specific key ($K_{ECS}$) is the AKMA application key ($K_{AF}$) derived as specified in the 3GPP TS 33.535. The step 2A may be skipped by the EEC 310, if the UE 202 holds the valid AKMA application key $K_{ECS}$ for the ECS 208a.

At steps 2B, and 2C, the AUSF 406 generates and provides the AKMA key ($K_{AKMA}$) to the AAnF 206, as specified in the 3GPP TS 33.535.

If there is a valid TLS session available with the ECS 208a, then the UE 202 skips steps 2D-2H.

If there is no valid TLS session available with the ECS 208a, then the steps 2D-2H may be performed to establish the secure TLS session between the UE 202 and the ECS 208a using the PSK based authentication. In accordance with the PSK based authentication, the PSK may be established between the ECS 208a and the EEC 310 of the UE 202 using the AKMA procedure.

At step 2D, the UE 202 initiates the TLS session establishment with the ECS 208a by enabling the EEC 310 to send the "Client Hello message" of the TLS protocol to the ECS 208a. The "Client Hello message" includes the AKMA ID, as to establish the PSK as part of the TLS session establishment procedure.

In an embodiment, the EEC details (like, the EEC ID, the UE ID, the AKMA Key ID, or the like) are carried as Client Hello extensions in the "Client Hello message". In another embodiment, the EEC details (like, the EEC ID, the UE ID, the AKMA Key ID, or the like) are carried in the vendor ID payload within the "Client Hello message".

On receiving the "Client Hello message" from the UE 202, at step 2F, the ECS 208a contacts the AAnF 206 (using the AKMA key ID) to obtain the corresponding AKMA application key ($K_{ECS}/K_{AF}$) of the UE 202. Based on the AKMA Key ID, at step 2G, the AAnF 206 provides the AKMA application key ($K_{ECS}$) to the ECS 208a and optionally corresponding ($K_{ECS}/K_{AF}$) lifetime in the key response.

The EEC 310 and the ECS 208a derive the PSK based on the AKMA application key derived/received at the step 2A and the step 2G, respectively. The EEC 310 and the ECS 208a perform the PSK based authentication to establish the secure TLS session between each other.

In an embodiment, the PSK based authentication may be used for the mutual authentication between the EEC 310 and the ECS 208a. In another embodiment, a server certificate may be used for the authentication of the ECS 208a and the PSK may be used for the authentication of the EEC 310.

In an embodiment, the PSK may be generated from the application key $K_{ECS}/K_{AF}$ at the EEC 310 and ECS 208a as follows:

$$PSK = KDF(K_{ECS}/K_{AF}, \text{other possible parameters})$$

wherein, the other possible parameters include at least one of, the FC value, any string like "PSK", the freshness parameter, or the like. The derivation of the PSK is described in detail in conjunction with FIG. 9, where the PSK may be represented as $K_{ECS-PSK}$.

In an embodiment, the AKMA application key $K_{ECS}/K_{AF}$ may be used as the PSK. In an embodiment, the PSK identified with at least one of: 128 least significant bits of the $K_{ECS}/K_{AF}$ and 128 most significant bits of the $K_{ECS}/K_{AF}$.

In an embodiment, an Internet key exchange version two (IKEv2) procedure may be performed instead of the TLS in steps 2D-2H. An IKEv2 PSK-based authentication or an Extensible Authentication Protocol (EAP)-PSK over an IKEv2 authentication may be performed to establish an IP security (IPSec) between the EEC 310 and the ECS 208a. The dynamically generated PSK ($K_{ECS}/K_{AF}$) may be used in the IKEv2 procedure. In order for the ECS 208a to obtain the PSK, the AKMA key ID is included in an IKEv2 message. In an embodiment, the IKEv2 message includes identification data, which is a value indicated by an identification type. A length of the identification data may be calculated from an IP payload header as specified in an RFC 7815. The AKMA key ID may be included in the ID payload header. In an embodiment, the identification data (which is a variable length field) may be considered as a concatenation of the EEC ID/UE ID, and the AKMA key ID.

In an embodiment, the EEC details (such as, the EEC ID, the UE ID, the AKMA Key ID, or the like) may be carried as IKEv2 extensions in the IKEv2 message. In another embodiment, the EEC details (such as, the EEC ID, the UE ID, the AKMA Key ID, or the like) may be carried in the vendor ID payload within the IKEv2 message.

In an embodiment, the AKMA key ID may be included in an IKE AUTH request message. The AKMA key ID may be accommodated in a Vendor ID or in a none field of the IKE AUTH request message.

In an embodiment, a secondary authentication as defined in the 3GPP TS 33.501 may be performed instead of the TLS in the steps 2D-2H. The EAP-PSK authentication may be performed between the EEC 310 and the ECS 208a. The dynamically generated PSK ($K_{ECS}/K_{AF}$) at steps 2A and 2G may be used for the EAP-PSK authentication. In order for the ECS 208a to obtain the PSK, the AKMA key ID is included in an EAP request message.

In steps 2I-2J, the UE 202/EEC 310 of the UE 202 initiates the service provisioning procedure with the ECS 208a (as specified in the clause 8.3 in the 3GPP TS 23.558 [2]). If the UE 202 is authorized to access the EES 208b, the ECS 208a generates and provides the access token to the EEC 310 of the UE 202. The message exchange between the EEC 310 and the ECS 208a (for example, the initial provisioning request and the response message) may be protected (at least one of, confidentiality, integrity, and replay protection) by the established TLS session.

In an embodiment, if the IPSec is established using the IKEv2 instead of the TLS in the steps 2D-2H, the message exchange between the EEC 310 and the ECS 208a may be protected using the IPSec. In an embodiment, if the secondary authentication is performed instead of the TLS in the steps 2D-2H, the message exchange between the EEC 310 and the ECS 208a may be protected using an application layer protection. In an example, the application layer protection may be a JSON Web Encryption (JWE, as specified in an RFC 7516).

At step 3, the EEC 310 performs the EEC registration (as specified in the clause 8.4.2 in the 3GPP TS 23.558 [2]) and discovery (as specified in the clause 8.5 in the 3GPP TS 23.558 [2]) with the EES 208b. At step 3A, before sending the access token to the EES 208b, the UE 202 and the EES 208b establish a secure TLS connection using an EES server certificate, which has been required to protect and to provide the access token to the authentic EES 208b.

At steps 3B-3E, the EEC 310 initiates the EEC registration procedure with the EES 208b including the access token obtained from the ECS 208a in the step 2J. The authorization check for the EEC registration request may be performed by verification of the access token issued by the ECS 208a to the EEC 310 of the UE 202. The EES 208b obtains an access token validation service from the ECS 208a.

In an alternate embodiment, the steps 3B-3E may be skipped and the EEC 310 may perform steps 3F-3I after the step 3A.

At steps 3F-3I, when the EEC 210 initiates the EAS discovery procedure with the EES 208b by including the same access token obtained from the ECS 208a in the step 2J. If the access token is valid, the EES 208b again obtains the access validation service from the ECS 208a. In an embodiment, the EES 208b may also request and obtain the access token from the ECS 208a for the UE 202 to grant the access to the EAS(s) 208c. In response to the request, the EES 208b includes the EAS access grant token(s), with relevant information like validity time, to the EEC 310 of the UE 202.

In case, if the access token obtained from the ECS (in step 2J) is not valid (due to time limitation), the EEC 310 requests the ECS 208a for a new access token by sending an access token request message to the ECS 208a. The access token request message includes necessary parameters to identify a security context of the EEC 310 and parameters for verification of the authenticity of the EEC 310/UE 202. After verification of the authenticity of the EEC 310, the ECS 208a provides a new access token to the EEC 310, in response to the access token request message.

Figure 9:
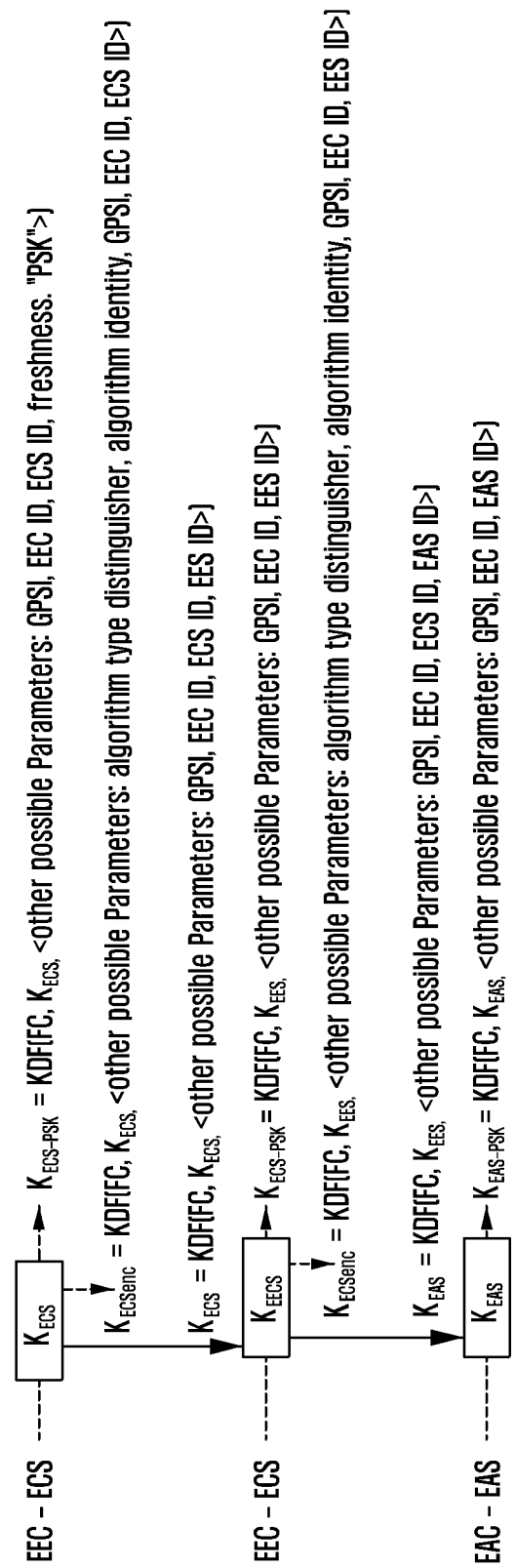
FIG. 9 is an example diagram depicting the derivation of the PSK, according to an embodiment of the disclosure.

In an embodiment, similar to steps (2D-2I) in establishing the secure connection between the EEC 310 and the ECS 208a, the EEC 310 and the EES 208b may establish a secure interface (for example, an EDGE-1 interface) using the TLS-PK authentication (wherein, a key $K_{EES}$ may be derived by the AAnF 206 using the AKMA key $K_{AKMA}$ instead of the AKMA application key $K_{ECS}$ by the ECS 208a as depicted in FIG. 9). The PSK may be established based on the AKMA procedure or an alternative PSK ($K_{EES-PSK}$).

At steps 4A-4F, the application client(s) 312 of the UE 202 obtains the edge computing services from the EAS 208c, by producing the access token obtained from the EES 208b over the secure TLS connection. The application client 312 also obtains a security policy and the relevant access token from the EES 208b in the step 3I. Before sending the access token to the EAS 208c, the application client 312 and the EAS 208c establish a secure channel using an EAS server certificate, which has been required to protected and to provide the access token to the authentic EAS 208c. The EAS 208c obtains the access token validation service from the ECS 208a via the EES 208b to validate the access token received from the application client 312 of the UE 202. After successful validation of the access token, the application client 312 obtains the edge computing service from the EAS 208c.

Figure 7:
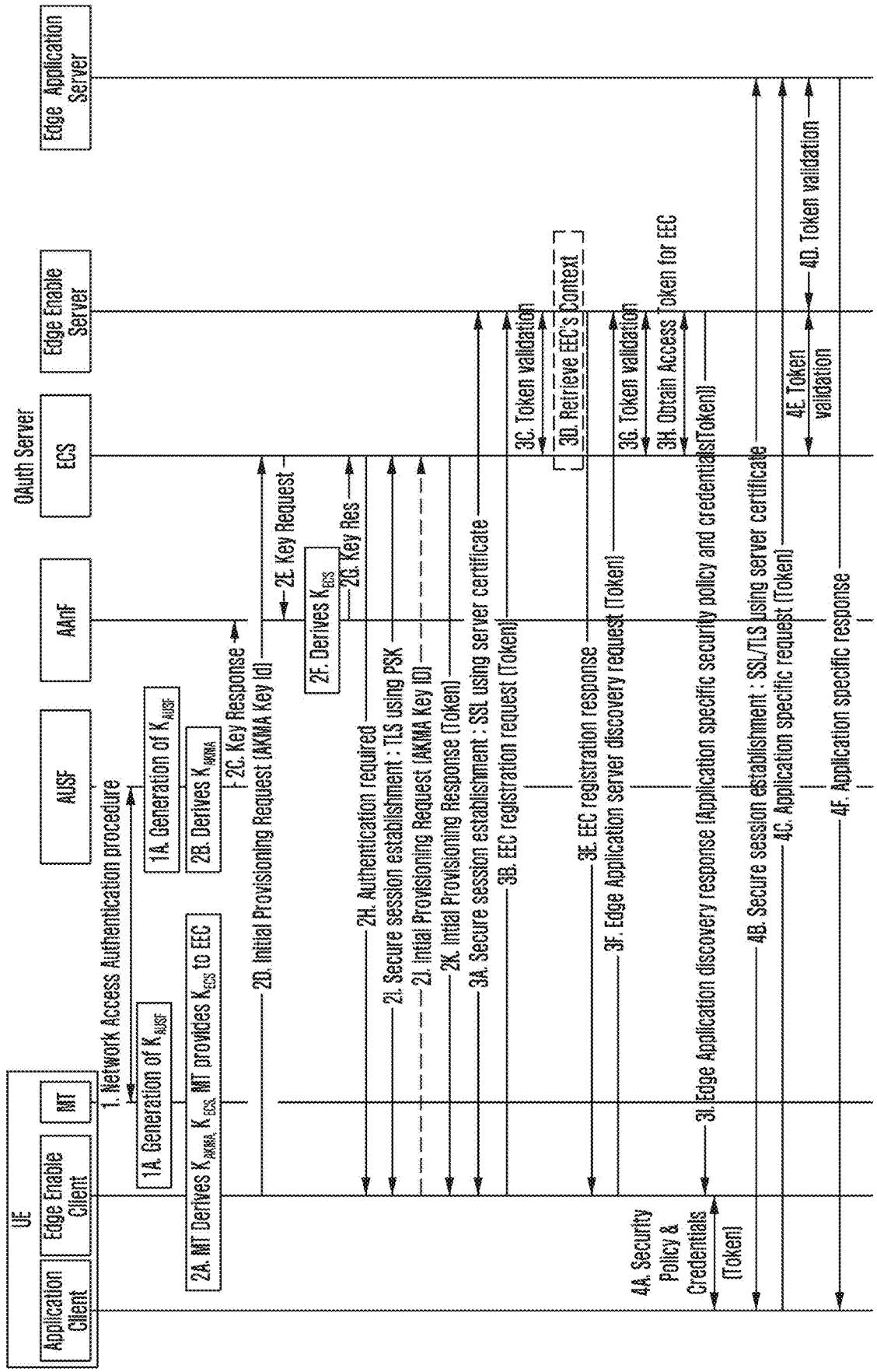
FIG. 7 depicts an example sequence diagram, where the UE and the ECS use the TLS with PSK-based authentication for securing the connection to access the edge computing services, where the details of the application key identifier is carried by a service provisioning request to establish the PSK before the TLS establishment procedure, according to an embodiment of the disclosure.

FIG. 7 depicts an example sequence diagram, where the UE 202 and the ECS 208a uses the TLS with PSK-based authentication for securing the connection to access the edge computing services, where the details of the AKMA key ID is carried by the service provisioning request to establish the PSK before the TLS session establishment procedure, according to an embodiment of the disclosure.

Referring to FIG. 7, at step 1, the MT 308a of the UE 202 performs procedures as defined in the 3GPP TS 23.502[5] to obtain the 5GC network access.

At step 1A, the MT 308a initiates the network access authentication procedure (i.e., a primary authentication and key agreement specified in the 3GPP TS 33.501, clause 6.1). On completion of the network access authentication procedure, the MT 308a and the AUSF 406 are in possession (successful generation) of the key $K_{AUSF}$.

At step 2A, the EEC 310 of the UE 202 derives the AKMA key as specified in the 3GPP TS 33.535 and optionally the further keys like the key ($K_{ECS}$) for the edge computing services. The key ($K_{ECS}$) is the AKMA application Key ($K_{AF}$) derived as specified in the 3GPP TS 33.535. The step 2A may be skipped by the EEC 310, if the UE 202 holds the valid $K_{ECS}$ for the ECS 208a.

At steps 2B, and 2C, the AUSF 406 generates and provides the AKMA key ($K_{AKMA}$) to the AAnF 206, as specified in the 3GPP TS 33.535.

If there is a valid TLS session available with the ECS 208a, then the UE 202 skips steps 2D-2I.

If there is no valid TLS session available with the ECS 208a, then the steps 2D-2I may be performed to establish the secure TLS session between the UE 202 and the ECS 208a using the PSK based authentication. In accordance with the PSK based authentication, the PSK may be established between the ECS 208a and the EEC 310 of the UE 202 using the AKMA procedure.

At steps 2D-2I, the service provisioning request (also be referred as edge computing service provisioning procedures) carrying the AKMA key ID initiates the ECS 208a to obtain the PSK by contacting the AAnF 206 using the information in the AKMA key ID, as to establish the PSK before initiation of the TLS session establishment procedure. Once the PSK is obtained (the PSK may be generated from the AKMA application key ($K_{ECS}/K_{AF}$) or the AKMA application key ($K_{ECS}/K_{AF}$) may be used as the PSK) at the EEC 310 and the ECS 208a, the TLS session/connection establishment procedure may be initiated by the EEC 310 to establish the TLS session with the ECS 208a using the PSK based authentication. The PSK based authentication may be used for the mutual authentication between the EEC 310 and the ECS 208a or for the authentication of the EEC 310.

The EEC 310 initiates the service provisioning procedure with the ECS 208a (as specified in the clause 8.3 in the 3GPP TS 23.558). The service provisioning procedures may include at least one of, a request-response procedure, a subscribe-notify procedure (including, a subscription update procedure and a unsubscribe procedure). In an example herein, the EEC 310 initiates the service provisioning procedure with the ECS 208a by sending the service provisioning request to the ECS 208a. The service provisioning request/request message from the EEC 310 includes the AKMA key ID.

FIGS. 8A and 8B depict a service provisioning request and a service provisioning response, respectively, according to various embodiments of the disclosure.

Referring to FIG. 8A, the service provisioning request is depicted in an example table. The AKMA procedure may be used to determine that the authentication and the secure connection is required to be established and the PSK is to be established. The ECS 208a contacts the AAnF 206 (using the AKMA key ID) to obtain the corresponding AKMA application key ($K_{ECS}/K_{AF}$). Based on the AKMA key ID, the AAnF 206 provides the AKMA application key ($K_{ECS}/K_{AF}$) to the ECS 208a. On obtaining the AKMA application key ($K_{ECS}/K_{AF}$) from the AAnF 206, the ECS 208a indicates the EEC 310 to initiate the TLS connection establishment procedure by sending a service provisioning response to the EEC 310.

Referring to FIG. 8B, the service provisioning response is depicted. On receiving the indication from the ECS 208a, the EEC 310 initiates the TLS connection establishment procedure using the PSK based authentication. The dynamically generated PSK (at step 2A and the step 2G) may be used to perform the PSK based authentication for establishing the TLS connection between the EEC 310 and the ECS 208a.

At steps 2I-2J, the EEC 310 of the UE 202 initiates the service provisioning procedure with the ECS 208a (as specified in the clause 8.3 in the 3GPP TS 23.558 [2]). If the UE 202 is authorized to access the EES 208b, the ECS 208a generates and provides the access token to the EEC 310 of the UE 202. The message exchange between the EEC 310 and the ECS 208a (for example, the initial provisioning request and the response message) may be protected (at least one of, confidentiality, integrity, and replay protection) by the established TLS session.

At step 3, the EEC 310 performs the EEC registration (as specified in the clause 8.4.2 in the 3GPP TS 23.558 [2]) and discovery (as specified in the clause 8.5 in the 3GPP TS 23.558 [2]) with the EES 208b. At step 3A, before sending the access token to the EES 208b, the UE 202 and the EES 208b establish a secure TLS connection using an EES server certificate, which has been required to protect and to provide the access token to the authentic EES 208b.

At steps 3B-3E, the EEC 310 initiates the EEC registration procedure with the EES 208b including the access token obtained from the ECS 208a in the step 2J. The authorization check for the EEC registration request may be performed by verification of the access token issued by the ECS 208a to the EEC 310 of the UE 202. The EES 208b obtains an access token validation service from the ECS 208a.

In an alternate embodiment, the steps 3B-3E may be skipped and the EEC 310 may perform steps 3F-3I after the step 3A.

At steps 3F-3I, when the EEC 210 initiates the EAS discovery procedure with the EES 208b by including the same access token obtained from the ECS 208a in the step 2J. If the access token is valid, the EES 208b again obtains the access validation service from the ECS 208a. In an embodiment, the EES 208b may also request and obtain the access token from the ECS 208a for the UE 202 to grant the access to the EAS(s) 208c. In response to the request, the EES 208b includes the EAS access grant token(s), with relevant information like validity time, to the EEC 310 of the UE 202.

In case, if the access token obtained from the ECS (in step 2J) is not valid (due to time limitation), the EEC 310 requests the ECS 208a for a new access token by sending an access token request message to the ECS 208a. The access token request message includes necessary parameters to identify a security context of the EEC 310 and parameters for verification of the authenticity of the EEC 310/UE 202. After verification of the authenticity of the EEC 310, the ECS 208a provides a new access token to the EEC 310, in response to the access token request message.

In an embodiment, similar to steps (2D-2I) in establishing the secure connection between the EEC 310 and the ECS 208a, the EEC 310 and the EES 208a may establish a secure interface (for example, an EDGE-1 interface) using the TLS-PK authentication (wherein, a key $K_{EES}$ may be derived by the AAnF 206 using the AKMA key $K_{AKMA}$ instead of the AKMA application key $K_{ECS}$ by the ECS 208a as depicted in FIG. 9). The PSK may be established based on the AKMA procedure or an alternative PSK ($K_{EES-PSK}$).

At steps 4A-4F, the application client(s) 312 of the UE 202 obtains the edge computing services from the EAS 208c, by producing the access token obtained from the EES 208b over the secure TLS connection/session. The application client 312 also obtains a security policy and the relevant access token from the EES 208b in the step 3I. Before sending the access token to the EAS 208c, the application client 312 and the EAS 208c establish a secure channel using an EAS server certificate, which has been required to protected and to provide the access token to the authentic EAS 208c. The EAS 208c obtains the access token validation service from the ECS 208a via the EES 208b to validate the access token received from the application client 312 of the UE 202. After successful validation of the access token, the application client 312 obtains the edge computing service from the EAS 208c.

In an embodiment, if the ECS 208a wants to send the service provisioning notification and there is not active TLS session, the ECS 208a sends an authentication required indication to the EEC 310 or triggers a re-authentication procedure. On receiving the authentication required indication from the ECS 208a or triggering the re-authentication procedure by the ECS 208a, the EEC 310 initiates the secure connection establishment procedure (TLS/IKEv2/Protocol Data Unit (PDU) session establishment procedure, so that the CN 204 initiates the secondary authentication procedure) or responds to the re-authentication procedure.

In an embodiment, the access token may be protected between an issuer (for example, the EEC 208a/EES 208b/EAS 208c/AAnF 206) and the UE 202/EEC 310 of the UE 202 using a symmetric cryptography irrespective of a security (for example, the TLS, the IPSec, or the like) of the EDGE interface (for example, an EDGE-1 interface, an EDGE-4 interface, or the like). Protection of the access token using the symmetric cryptography is described in detail in conjunction with FIG. 10.

FIG. 9 is an example diagram depicting the generation of the PSK based on the AKMA application key ($K_{AKMA}$), according to an embodiment of the disclosure.

Referring to FIG. 9, in an embodiment, the PSK may be generated from the application key $K_{ECS}/K_{AF}$ at the EEC 310 and ECS 208a as follows:

PSK=KDF($K_{ECS}/K_{AF}$, other possible parameters)

wherein, the other possible parameters include at least one of, the FC value, any string like "PSK", the freshness parameter, or the like. The other possible ways of deriving the PSK is depicted in FIG. 9.

Figure 10:
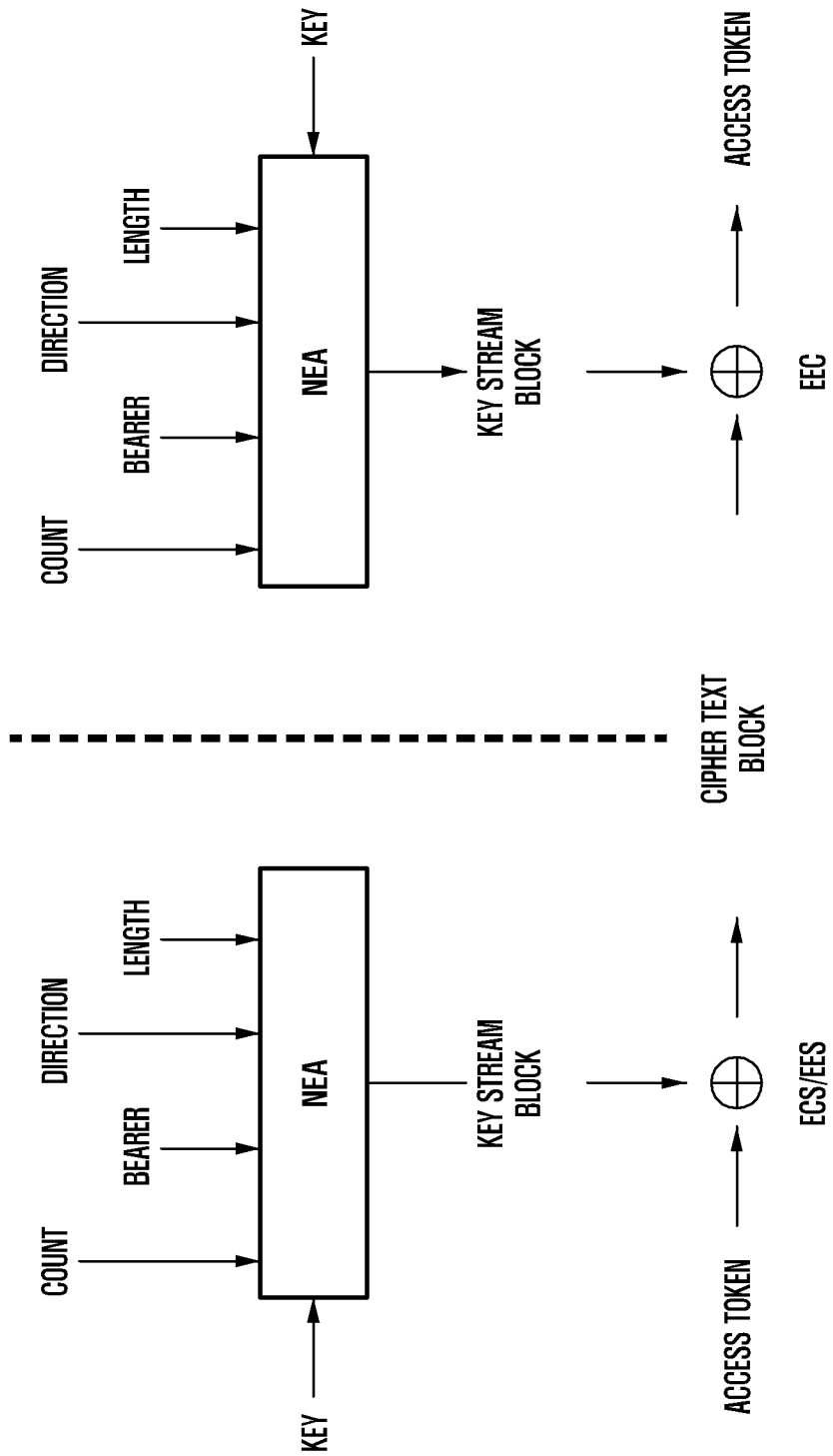
FIG. 10 is an example diagram depicting the symmetric cryptography or an encryption and decryption mechanism used for protection of access token, according to an embodiment of the disclosure.

FIG. 10 is an example diagram depicting the symmetric cryptography or an encryption and decryption mechanism used for the protection of the access token, according to an embodiment of the disclosure.

Referring to FIG. 10, input parameters may be provided to a ciphering module for generating a key stream block. The input parameters may include at least one of, a 128-bit cipher key named KEY, a 32-bit COUNT, a 5-bit bearer identity BEARER, a 1-bit direction of a transmission (i.e., DIRECTION), a length of a keystream required (i.e., LENGTH), and so on. The input parameters may be equal to an encryption key, for example, at least one of: $K_{ECSenc}$, $K_{EESenc}$. In an example, all BEARER bits have to be set to 1, the DIRECTION bit has to be set to 1, and the COUNT has to be constructed as COUNT=0x00||Counter$_{EEC}$. The key stream block and the access token may be provided to a counter, which provides a cipher text block (i.e., encrypted access token). Similarly, at the UE 202/EEC 310, the key stream block and the cipher text block may be provided to the counter, which provides the access token by decrypting the cipher text.

The EEC 310 of the UE 202 and the ECS 208a associates a 16-bit counter, Counter$_{EEC}$, with the key $K_{ECS}$. The EEC 310 initializes the Counter$_{EEC}$ to 0x00 0x01, when the AKMA application key ($K_{ECS}$) is derived. The EEC 310 and the ECS 208a maintains the Counter$_{EEC}$ for lifetime of the AKMA application key ($K_{ECS}$). The EEC 310/ECS 208a sets the Counter$_{EEC}$ to 0x00 0x02 after a first usage, and monotonically increments the Counter$_{EEC}$ for each additional usage. The Counter$_{EEC}$ may be incremented by the EEC 310/ECS 208a for every usage. The EEC 310 and the ECS 208a exchange the value of the Counter$_{EEC}$ (used to generate a MAC-I or encryption) along with the protected message between each other. The EEC 310 or the ECS 208a accepts the Counter$_{EEC}$ value that is greater than the stored Counter$_{EEC}$ value. The ECS 208a stores the received Counter$_{EEC}$.

Embodiments herein also disclose a new procedure for establishing the PSK to protect the EDGE interfaces (for example, the EDGE-1 interface and/or the EDGE-4 interface). The EEC 310 initiates an initial security establishment procedure by sending an initial security establishment request message to the ECS 208a/EES 208b (instead of the step 2D in FIG. 7). The initial; security establishment request message includes at least one of, the AKMA Key ID, the UE ID, the EEC ID, or the like.

On receiving the initial security establishment request message, the ECS 208a/EES 208b may perform the similar steps 2E-2G as depicted in FIG. 7, if the valid PSK is not available with the ECS 208a/EES 208b for the UE 202. The steps 2E-2G as depicted in FIG. 7 may be performed by the ECS 208a/EES 208b to obtain a valid key or to determine a valid key and successful generation of the PSK. On obtaining the valid key or determining the valid key and successful generation of the PSK, the ECS 208a/EES 208b sends an initial security establishment response message to the EEC 310. The initial security establishment response message includes a status as success with other possible parameters (instead of the step 2H depicted in FIG. 7). On receiving the status as success from the ECS 208a/EES 208b, the EEC 310 performs rest of the steps detailed in FIG. 7 from the step 2I. In an embodiment, if the generation of the PSK is unsuccessful, then the initial security establishment response message includes the status as error. In such a scenario, the EEC 310 may abort the session for accessing the edge computing services.

Embodiments herein enable an authentication of the UE prior to an actual communication between the UE and the ECS by provisioning required credentials and establish a secure session/connection between the UE and the ECS for accessing the edge computing services, based on a successful authentication and authorization of the UE and the ECS. Embodiments herein use an AKMA network service for authentication and establishment of the secure connection between the UE and the ECS. The AKMA network service is an authentication and key agreement service, where access to an application function (AF)/server (for example, the ECS) and establishment of the secure connection between the UE and the AF is based on network access security credentials established during a primary authentication of the UE.

The embodiments disclosed herein can be implemented through at least one software program running on at least one hardware device and performing network management functions to control the elements. The elements shown in FIGS. 2, 3, 4, and 5 can be at least one of a hardware device, or a combination of hardware device and software module.

The embodiments disclosed herein describe methods and systems for authentication and establishment of secure connection for edge computing services. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an application-specific integrated circuit (ASIC), or a combination of hardware and software means, e.g., an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of CPUs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) for accessing an edge computing service, the method comprising:
    performing a network access authentication procedure;
    deriving an authentication and key management for applications (AKMA) key;
    transmitting, to an edge configuration server (ECS), a provisioning request message including an identifier (ID) of the AKMA key;
    receiving, from the ECS, a message related to authentication;
    obtaining a pre-shared key (PSK); and
    performing, with the ECS, an establishment procedure of a transport layer security (TLS) session with the PSK based on authentication for mutual authentication.

2. The method of claim 1, wherein the UE includes an edge enabler client (EEC).

3. The method of claim 1, wherein the network access authentication procedure is a primary network access procedure.

4. The method of claim 1, wherein the ID of the AKMA key is used by the ECS for contacting an entity corresponding to an AKMA anchor function (AAnF) to obtain an edge configuration server specific key ($K_{ECS}$).

5. The method of claim 1,
   wherein the PSK is derived as an output of a key derivation function (KDF), and
   wherein inputs of the KDF include an edge configuration server specific key ($K_{ECS}$) and parameters including at least one of, a Function Code (FC) value, a Generic Public Subscription Identifier (GPSI), an edge enabler client (EEC) ID, an ECS ID, a text string like "PSK", or a freshness parameter.

6. The method of claim 5, wherein the freshness parameter is a counter value maintained by the EEC of the UE.

7. A User Equipment (UE) in an edge computing system comprising:
   a memory; and
   a controller coupled to the memory and configured to:
     perform a network access authentication procedure,
     derive an authentication and key management for applications (AKMA) key,
     transmit, to an edge configuration server (ECS), a provisioning request message including an identifier (ID) of the AKMA key,
     receive, from the ECS, a message related to authentication,
     obtain a pre-shared key (PSK), and
     perform, with the ECS, an establishment procedure of a transport layer security (TLS) session with the PSK based on authentication for mutual authentication.

8. An edge configuration server (ECS) in an edge computing system comprising:
   a memory; and
   a controller coupled to the memory configured to:
     receive, from a user equipment (UE), a provisioning request message including an identifier (ID) of an authentication and key management for applications (AKMA) key,
     obtain an edge configuration server specific key ($K_{ECS}$) by contacting an entity corresponding to an AKMA anchor function (AAnF) based on the ID of the AKMA key,
     derive a pre-shared key (PSK) based on the edge configuration server specific key ($K_{ECS}$), and
     perform, with the UE, an establishment procedure of a transport layer security (TLS) session with the PSK based on authentication for mutual authentication.

9. A method performed by an edge configuration server (ECS) for an edge computing service, the method comprising:
   receiving, from a user equipment (UE), a provisioning request message including an identifier (ID) of an authentication and key management for applications (AKMA) key;
   obtaining an edge configuration server specific key ($K_{ECS}$) by contacting an entity corresponding to an AKMA anchor function (AAnF) based on the ID of the AKMA key;
   deriving a pre-shared key (PSK) based on the edge configuration server specific key ($K_{ECS}$); and
   performing, with the UE, an establishment procedure of a transport layer security (TLS) session with the PSK based on authentication for mutual authentication.

10. The method of claim 9, further comprising:
    transmitting, to the entity corresponding to the AAnF, a key request; and
    receiving, from the entity corresponding to the AAnF, a key response including the edge configuration server specific key ($K_{ECS}$),
    wherein the edge configuration server specific key ($K_{ECS}$) corresponds to the ID of the AKMA key.

11. The method of claim 9, wherein the ECS provides configuration information to the UE to connect with an edge application server (EAS) for accessing edge computing services.

* * * * *